3,150,177
PROCESS FOR PRODUCING BIURET
Arno Kluge, Bad Soden, Taunus, Germany, assignor to Colgate-Palmolive Company, New York, N.Y., a corporation of Delaware
No Drawing. Filed June 24, 1960, Ser. No. 38,457
Claims priority, application Germany, July 15, 1959, P 23,167
4 Claims. (Cl. 260—553)

The present invention relates to an improved process for the preparation of biuret.

It has previously been proposed to produce biuret by heating urea beyond its melting point (132.7° C.), one molecule of biuret being formed from two molecules of urea while a molecule of ammonia is split off. However, side reactions also occur, producing by-products such as cyanuric acid which contaminate the final product.

In the course of heating urea, elimination of ammonia and the formation of biuret commences to some extent at 100° C. and increases with increasing temperature. At somewhat higher temperatures, cyanuric acid, which is very difficultly soluble in water is formed. At even higher temperatures, i.e., above 180° C., cyanuric acid is formed as the main product.

Several processes have previously been proposed for the conversion of urea to biuret but none has been found which is completely satisfactory in that the biuret obtained contains substantial amounts of cyanuric acid. Often the yield of biuret is very low and the reaction period is very long.

In accordance with the present invention biuret of substantially improved purity and freedom from cyanuric acid is obtained by heating urea to about 140° to 160° C. to form a molten reaction mass, holding the reaction mass at 140° to 160° C. until the initiation of clouding therein, dissolving said reaction mass in aqueous alkali to form a solution of biuret and a water soluble alkali salt of any by-product cyanuric acid present, and recovering said biuret from said solution. Preferably the reaction is carried out by quickly preheating the urea at normal pressure with slow stirring to 140° C., then removing volatile components, particularly ammonia, from the reaction mass by the application thereto of reduced pressure, e.g., 140 to 150 mm. Hg, raising the temperature, preferably during about 10 minutes to about 150° to 160° C. and simultaneously reducing the pressure, e.g. to 50 to 75 mm. Hg, and maintaining these last mentioned conditions until the clear melt just begins to evidence cloudiness. Immediately on the initiation of clouding, the molten material is poured into a dilute aqueous alkali solution, preferably one containing 2 to 3% of NaOH. The aqueous mixture is heated with stirring to 50 to 70° C. to achieve complete dissolution of the solid particles, forming thereby a concentrated solution of biuret along with the alkali salt of the by-product cyanuric acid which is present. Thereafter, the solution is cooled, causing the biuret, which is only poorly soluble in water, to crystallize selectively therefrom, whereas the alkali cyanurate, being highly soluble, remains in the mother liquor. Finally, the crystallized biuret is recovered by mechanical separation from the cyanurate-containing mother liquor, and is washed and dried.

If desired, the urea may be heated in the presence of a catalyst which is soluble in and does not form a precipitate with the alkali solution. Illustrative of preferred catalysts of this class are disodium phosphate and boric acid.

In carrying out the process of the invention, it is desirable that the urea be melted and heated as quickly as possible to 135° to 140° C. at normal pressure, following which vacuum is applied to increase the formation of biuret by removal of ammonia. Thereafter the temperature is raised to 150° to 160° C., which should not be exceeded since at higher temperatures the biuret already formed further reacts to form cyanuric acid.

It has been found important to minimization of the formation of by-product cyanuric acid to terminate the reaction prior to the time at which the reaction mass or melt develops substantial cloudiness, as clouding indicates that the molten reaction mass is saturated with cyanuric acid and that undissolved cyanuric acid is precipitating from the molten mass. On the other hand, premature cessation of the reaction tends to diminish the yield of biuret. Accordingly, the reaction desirably is permitted to proceed until the molten mass shows a slight clouding, at which time reaction is stopped by elimination of vacuum and heating and discharge of the mass into a dilute, e.g., 2 to 3%, aqueous solution of an alkali which forms a water soluble salt with cyanuric acid, as for example sodium hydroxide or carbonate or potassium hydroxide. The alkali solution may initially be cold, i.e., at ambient temperature, however in order to dissolve completely the biuret, which is of quite limited solubility in cold water, the aqueous alkaline solution into which the reaction mass has been discharged is heated until a clear liquor is obtained. By employing a solution of an alkali forming a highly water soluble salt of cyanuric acid, the minor amount of cyanuric acid present as a by-product is transformed into a highly soluble salt. On partial crystallization of the solids from the solution, such as occurs on cooling, the biuret crystallizes in such a pure form that no further purification steps are necessary and the cyanuric acid, which normally is substantially less soluble than the biuret, remains in the mother liquor as a cyanurate salt.

The following example is set forth in order to additionally illustrate the present invention, and it will be understood that the invention is not limited thereto. All quantities indicated are by weight unless otherwise specified.

*Example*

A mixture of 1000 parts of urea and 12.5 parts of $Na_2HPO_4.12H_2O$ are rapidly heated with slow stirring to 140° C. at normal atmospheric pressure in a closed vessel furnished with an agitator. As soon as the urea melts and reaches 140° C., the pressure in the reaction vessel is reduced to 140 to 150 mm. Hg and ammonia gas liberated in the formation of biuret is removed. The reaction progresses while the temperature is raised during a 10 minute period to 150° to 160° C., the pressure being simultaneously reduced to 50 to 75 mm. Hg. To aid in completion of the reaction, the reaction mass, which is clear, is maintained with stirring at a temperature of 150° to 160° C. and a pressure of 50 to 75 mm. Hg until it begins to cloud, which requires about 60 to 70 minutes. On initiation of clouding, the molten reaction mass is immedately poured into 1000 parts of a 2.7% sodium hydroxide solution at 20° C. This mixture is stirred and heated to 50° to 70° C. until a clear solution is obtained. The clear solution is then cooled, and biuret crystallizes therefrom in the form of fine needles which are removed from the mother liquor by vacuum filtration, washed with a small amount of ice water, and dried at 110° C. to remove water of crystallization. The product constitutes highly pure-crystals of biuret which are substantially completely free of any cyanuric acid or sodium cyanurate. The residual mother liquor, which contains highly soluble sodium cyanurate, is discarded.

Yield (of biuret): 280 parts—33% of theoretical yield
Melting point: 190° C.
Nitrogen content: Calculated 40.8%, found 40.7%

2 grams of the biuret produced this way are dissolved in 100 grams of water. The solution thus obtained is completely clear. In comparison, a corresponding solution was prepared from biuret made according to the process described in U.S. Patent 2,524,049 and recrystallized three times from water. This solution showed a distinct turbidity, caused by the presence of cyanuric acid.

While there has been disclosed that which at present is considered to be the preferred embodiment of the invention, it will be understood of course that changes, modifications and variations may be made therein without departing from the true scope of the invention as defined in the appended claims.

What is claimed is:

1. A process for the preparation of biuret from urea, said biuret being substantially free of cyanuric acid, which comprises heating urea at atmospheric pressure to about 140° C. to form a melt, subjecting the heated melt to a reduced pressure of about 140 to 150 mm. of mercury, raising the temperature of said melt over a period of about 10 minutes to about 150° to 160° C. and simultaneously reducing the pressure to below about 75 mm. of mercury to form a clear biuret-containing reaction mass, holding said mass at about 150° to 160° C. and a pressure below about 75 mm. of mercury until the initiation of clouding therein, and immediately thereupon discharging said mass into an aqueous solution of sodium hydroxide, dissolving said mass therein to form a solution of biuret and the sodium salt of any by-product cyanuric acid present, cooling said biuret solution to cause said biuret to crystallize selectively therefrom, and recovering and washing and drying said crystals to produce biuret substantially completely free of cyanuric acid and sodium cyanurate.

2. A process for the preparation of biuret from urea as set forth in claim 4 wherein said aqueous solution of sodium hydroxide contains about 2 to 3% thereof.

3. A process for the preparation of biuret from urea as set forth in claim 4 wherein said aqueous sodium hydroxide solution containing said discharged reaction mass is heated to about 50° to 70° C. to facilitate solution of said reaction mass.

4. A process for the preparation of biuret as set forth in claim 1 wherein said urea is heated in the presence of a catalyst which is soluble in and does not form a precipitate with said aqueous alkali said catalyst being selected from the group consisting of disodium and boric acid.

References Cited in the file of this patent

UNITED STATES PATENTS

| 2,524,049 | Garbo | Oct. 3, 1950 |
| 2,566,231 | Paden et al. | Aug. 28, 1951 |
| 2,647,119 | Haworth et al. | July 28, 1953 |
| 2,894,950 | Lloyd et al. | July 14, 1959 |
| 2,956,056 | Christian | Oct. 11, 1960 |

OTHER REFERENCES

Hofman: Chem. Berichte, vol. 4, (1871), pp. 262–69, page 263.